Nov. 17, 1964  E. H. BOITEN  3,157,848

ADJUSTABLE MAGNETIC FLUX-SOURCE

Filed Oct. 19, 1959

INVENTORS
Egbert Hendrik Boiten
BY
Watson, Cole, Grindle & Watson
ATTORNEYS

United States Patent Office 3,157,848
Patented Nov. 17, 1964

3,157,848
ADJUSTABLE MAGNETIC FLUX-SOURCE
Egbert Hendrik Bolten, Pijnacker, Netherlands, assignor to The Nederlandse Organisatie voor Toegepast-Natuurwetenschappelijk Onderzoek ten Behoeve van Nijverheid, Handel en Verkeer, The Hague, Netherlands, a corporation of the Netherlands
Filed Oct. 19, 1959, Ser. No. 847,262
Claims priority, application Netherlands, Oct. 28, 1958, 232,675
5 Claims. (Cl. 336—110)

The invention relates to an adjustable magnetic flux source for introducing an adjustable premagnetization into magnetic circuits, such as self-inductances, magnetic amplifiers, etc., which are controllable by premagnetization, with the aid of permanent magnets.

A similar magnetic flux source is known from British patent specification No. 763,497. In this patent specification a variable inductance is described, which as a flux source uses a permanent magnet in a ferro-magnetic circuit.

Hereby the ferro-magnetic circuit serves as a path for the lines of force of said magnet.

The self-inductions of the coils of the variable inductance, which coils are positioned in air gaps in the magnetic circuit, are varied by turning a movable ferro-magnetic member in circle segment from additionally provided in the circuit, or by turning the segment-shaped magnet in the circuit itself.

A drawback of this magnetic flux source is, that the internal magnetic resistance of the magnetic circuit changes, owing to the fact that at the turning of the movable ferro-magnetic member or of the adjustable magnet, among other things the cross-section of this circuit will change locally.

Owing to this fact such a flux sources does not recommend itself for use in a modulator as will hereinafter be explained.

An object of the invention is therefore a magnetic flux source the magnetomotive force of which is adjustable without the internal magnetic resistance of this source being changed.

To this end according to the invention a disc or a ring-shaped permanent magnet is used in the ferro-magnetic circuit, which permanent magnet can be adjusted by rotation without the cross-section of the circuit locally changing.

The rotatable permanent magnet is preferably positioned between or on a yoke of ferro-magnetic material comprising two parts, whereby said permanent magnet is magnetized in such a way, that in a rotational sense the magnetization in one half of the disc or ring is opposite to the magnetization of the other half.

The rotatable magnet, hereinafter called magnetic potentiometer, can as a matter of course also be magnetized in such a manner, that near to the circumference north and south poles alternate.

It is also desirable, that the influence of the flux source on the coil core should consist only of the flux excited in the core by the magnetomotive force of the magnet. To this end, as will hereinafter be explained, an object of the invention is a magnetic flux source having a high internal magnetic resistance.

It is also desirable to keep the eddy current losses in the flux source low, wherefore a further object of the invention is a magnetic flux source with a high electric resistance.

Another object of the invention is a magnetic flux source having a high stability adjusting mechanism.

Yet another object of the invention is a flux source having a wide regulation range.

And still another object of the invention is a modulator, which can be controlled by premagnetization, and which uses the adjustable magnetic flux source according to the invention.

The invention will be further elucidated with reference to a drawing, in which.

In these figures like reference numerals indicate like parts of the various embodiments of the invention.

Figure 1:
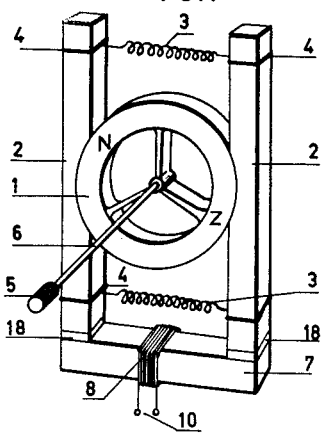
FIG. 1 and FIG. 2 represent perspective views of magnetic flux sources embodying the invention.

In FIGURE 1 the springs 3 of non-magnetic material draw a yoke 2 consisting of two parts against the ring-shaped magnetic potentiometer 1 with the aid of clips 4.

The figure schematically represents a magnetic circuit, consisting of a core 7 provided with a coil 8 having connections 10. The core 7 of this magnetic circuit closes the magnetic circuit of the magnetic flux source comprising the yoke 2, the permanent magnet 1 and the poles or the end faces 18. The premagnetization in the magnetic circuit is adjusted by turning the magnetic potentiometer 1 with the aid of for instance the controlling knob 5 and a spindle 6.

At a rotation of the permanent magnet no change is brought about in the internal magnetic resistance of the magnetic circuit of the flux source. It is desirable, that the premagnetization should be the only influence exerted by the flux source on the magnetic circuit.

The self-induction of the coil 8 is, however, not only determined by the magnetic resistance of the core 7 which is determined by the premagnetization in said core 7, but also by the magnetic resistance of the flux source which is connected in parallel to it. The magnetic resistance of the flux source should therefore be as high as possible in order to keep its influence low. At the same time the magnetic flux of the flux source is now independent of the magnetic resistance of the core 7.

Part of the flux caused by the current through the coil 8 also passes through the flux source. When this current is an alternating current, this part of the flux will therefore cause eddy current losses in the flux source. In order to limit these losses the flux source should have a high electrict resistance.

Both these requirements are fulfilled by non-metallic magnetic material such as "Ferroxdure," the reversible permeability of which amounts to $\mu$ rev.$=1.1$ to $1.4$ and its specific resistance to about $10^6$ ohm-meters. In the Encyclopedic Dictionary of Electronics and Nuclear Engineering by Robert I. Sarbacher, Prentice-Hall, Inc., Englewood Cliffs, N.J./1959, differential permeability is given as a synonym for reversible permeability.

Permeability, differential symbol $\mu_d$ or $\mu_r$.

The limiting value of incremental permeability as the amplitude of the alternating magnetic field approaches zero. The value of the differential permeability is the slope of the magnetization curve at any specified point and thus differs for different values of H. Thus, $$\mu_d = \frac{dB}{dH}$$

at a given H where B and H are the magnitudes of B and H.

The magnetic potentiometer is therefore preferably made of a similar magnetically hard oxidic ceramic material, while the yoke is preferably made of a magnetically soft material of very high permeability, for instance a manganese zinc ferrite such as "Ferroxcube 3A."

The flux source can be made light, compact and mechanically stable, in that air gaps for the adjustment of the premagnetization in the magnetic circuit are avoided, and in that the flux source can be supported by or be directly secured to the magnetic circuit.

Figure 2:
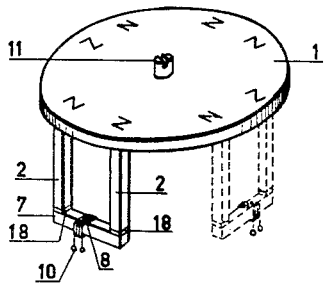

FIG. 2 represents another embodiment of the invention. In this figure a magnetic potentiometer 1 cut in disc-shape is rotatably mounted on the end faces of the yoke 2 consisting of two parts.

Near to the periphery of the potentiometer north and south poles alternate. With such a potentiometer a plurality of magnetic circuits can be simultaneously pre-magnetized, as it is shown in the figure by dotted lines for a second magnetic circuit.

Figure 3:
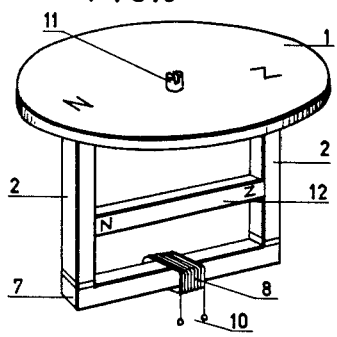
FIG. 3 represents, schematically and in perspective, an embodiment of an adjustable magnetic flux source according to the invention, wherein the flux source, by the application of an extra permanent magnet between the yoke, is provided with a shifted regulation range.

FIG. 3 represents a magnetic flux source having a magnetic potentiometer 1 and in addition to this being provided with a rod-shaped permanent magnet 12, which permanent magnet preferably has the same physical properties as the magnetic potentiometer. The direction of the magnetization caused by the magnetic potentiometer, can now be adjusted in such manner as to co-operate with or to counteract the field of the permanent magnet 12 in the core 7.

Thus it is possible, by a judicious choice of the magnetizations of the magnetic potentiometer 1 and the permanent magnet 12, to vary the field strength in the core 7 between zero and a maximum value.

At a rotation of the potentiometer over an angle of 180° the flux source brings about a great flux change, that is $2\phi_n$ if $\phi_n$ is the maximum magnetomotive current which can be produced by the potentiometer alone; the magnetomotive current of the permanent magnet 12 also is $\phi_n$.

As a matter of course it is also possible to execute the permanent magnet 12 as a magnetic potentiometer.

Figure 4:
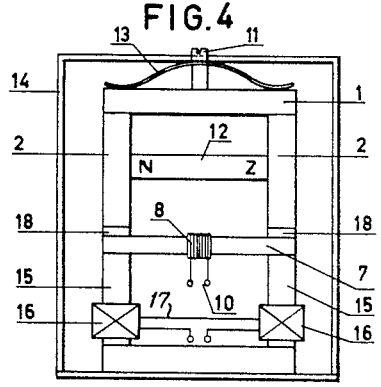
FIG. 4 represents a modulator, in which an adjustable magnetic flux source is used according to the embodiment of FIG. 3.

The flux source as sketched in FIGURE 3 can be advantageously applied in a modulator as is indicated in FIGURE 4.

The oscillator coil 8 with the connections 10 is placed on the coil core 7, which has a reasonably high permeability, for instance a nickel-zinc ferrite of cubic crystal-structure such as "Ferroxcube 4B." The control yoke 15 is made of the same magnetically soft material as the yoke 2 of the magnetic flux source. Two control coils 16, linked in series by leads 17, are provided on the legs of the control yoke 15. The signal current is supplied to the control coils.

Figure 5:
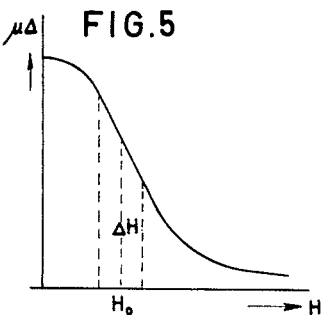
FIG. 5 represents a graph, in which the incremental permeability of the core is set out against the strength of the field in the core of the magnetic circuit.

By turning the magnetic potentiometer 1 of the flux source the premagnetization is adjusted in such a manner, that the magnetization of the core 7 is situated in a linear part of the $\mu\Delta$–H curve, see FIGURE 5, point $H_0$. If care is taken for the signal current through the control coils to be proportional to the field strength in the control yoke, then the change of the incremental permeability $\mu\Delta$ of the core 7 is also proportional to the control current. Herefrom it follows, that the change of the self-induction of the coil 8, and with it the frequency change of the oscillator, is proportional to the control current.

The coil of the oscillator coil 8 can advantageously be separated into two equal parts, and arranged on the halves of a ring-shaped coil core 7 whereby it is prevented that a voltage is induced in the coil consequentially to the fluctuating field strength. If the change of the premagnetization (the point $H_0$) by an adjustment of the magnetic potentiometer 1 remains within the linear part of the $\mu\Delta$–H curve, the carrier wave frequency can, if the modulator is used as a frequency modulator, be varied while retaining the same modulation sensitivity.

The modulator can be enclosed in a case of non-magnetic material.

The spring 13 presses the magnetic potentiometer 1 against the yoke 2 comprising two parts. The rod 11, which is connected to the magnetic potentiometer 1, is used for adjusting the premagnetization. By using the adjustable magnetic flux source according to the invention in the modulator the following advantages are obtained.

The self-induction of the oscillator coil can be controlled within very wide limits.

Because the reversible permeability of the magnet material of the magnetic potentiometer 1 and the permanent magnet 12 is only slightly greater than 1, the magnetic resistance of the magnetic flux source is considerable.

As a result of this only very few lines of force of the control yoke 15 choose their way through the flux source, whereby on the one hand the modulation sensitivity is increased and on the other hand the modulation sensitivity is only very slightly affected by the adjusting of the disc.

I claim:

1. A modulator which is controllable by premagnetization, comprising a control coil and oscillation means comprising an oscillator coil, each coil having terminals and wound around a core with end poles, the said cores being made of non-metallic, magnetically soft material of high permeability, said control coil terminals constituting means for connection of an external control signal source, an adjustable magnetic flux source having a yoke of non-metallic, magnetically soft material of high permeability and high specific resistance, said yoke being divided into parts by at least one permanent ring magnet, said magnet being rotatably mounted and frictionally engaged between the parts of the yoke, said yoke being provided with end poles, each of said end poles being magnetically connected to one end pole of each of said cores, and said permanent magnet being made of a non-metallic, magnetic material and being magnetized with alternate north and south poles near its circumference.

2. A modulator which is controllable by premagnetization, comprising a control coil and oscillation means comprising an oscillator coil, each having terminals and a core with end poles, the said cores being made of non-metallic, magnetically soft material of high permeability, said control coil terminals constituting means for connection of an external control signal source, an adjustable magnetic flux source having a yoke of non-metallic, magnetically soft material of high permeability and high specific resistance, said yoke being divided into parts by at least one disc-shaped magnet, said magnet being rotatably mounted and frictionally engaged between the parts of the yoke, said yoke being provided with end poles, each of said end poles being magnetically connected to one end pole of each of said cores, and said permanent magnet being made of non-metallic, magnetic material and being magnetized with alternate north and south poles near its circumference.

3. A modulator according to claim 1, wherein said permanent magnet has the property that the quotient of its remanent induction and of its coercive force approximates one.

4. A modulator according to claim 2, wherein said magnet has the property that the quotient of its remanent induction and of its coercive force approximates one.

5. A modulator which is controllable by premagnetization comprising an electromagnet which is controllable by a current and including a core, an adjustable magnetic flux source and an oscillator coil having a core, which oscillator core connects the poles of the electromagnet and the poles of the flux source, said flux source comprising a ferromagnetic yoke having at least two parts and at least one disc-shaped permanent magnet, said magnet being rotatably mounted between said parts of said yoke, and being made of a magnetic material of great coercivity and low remanent induction, and being magnetized with alternate north and south poles on its circumference.

References Cited by the Examiner

UNITED STATES PATENTS

| | | | |
|---|---|---|---|
| 2,680,222 | 6/54 | Schwieg | 336—110 X |
| 2,724,075 | 11/55 | Van Urk et al. | 336—110 X |
| 2,854,607 | 9/58 | Niklas et al. | 336—110 X |
| 2,860,313 | 11/58 | Israel | 336—110 |
| 2,870,423 | 1/59 | Bickers | 336—110 |

FOREIGN PATENTS

| | | |
|---|---|---|
| 1,011,769 | 4/52 | France. |
| 740,532 | 11/55 | Great Britain. |

JOHN F. BURNS, *Primary Examiner.*

LLOYD McCOLLUM, *Examiner.*